March 28, 1961 W. STELZER 2,976,850
FLUID PRESSURE OPERATED MOTOR
Filed Aug. 7, 1959 3 Sheets-Sheet 1
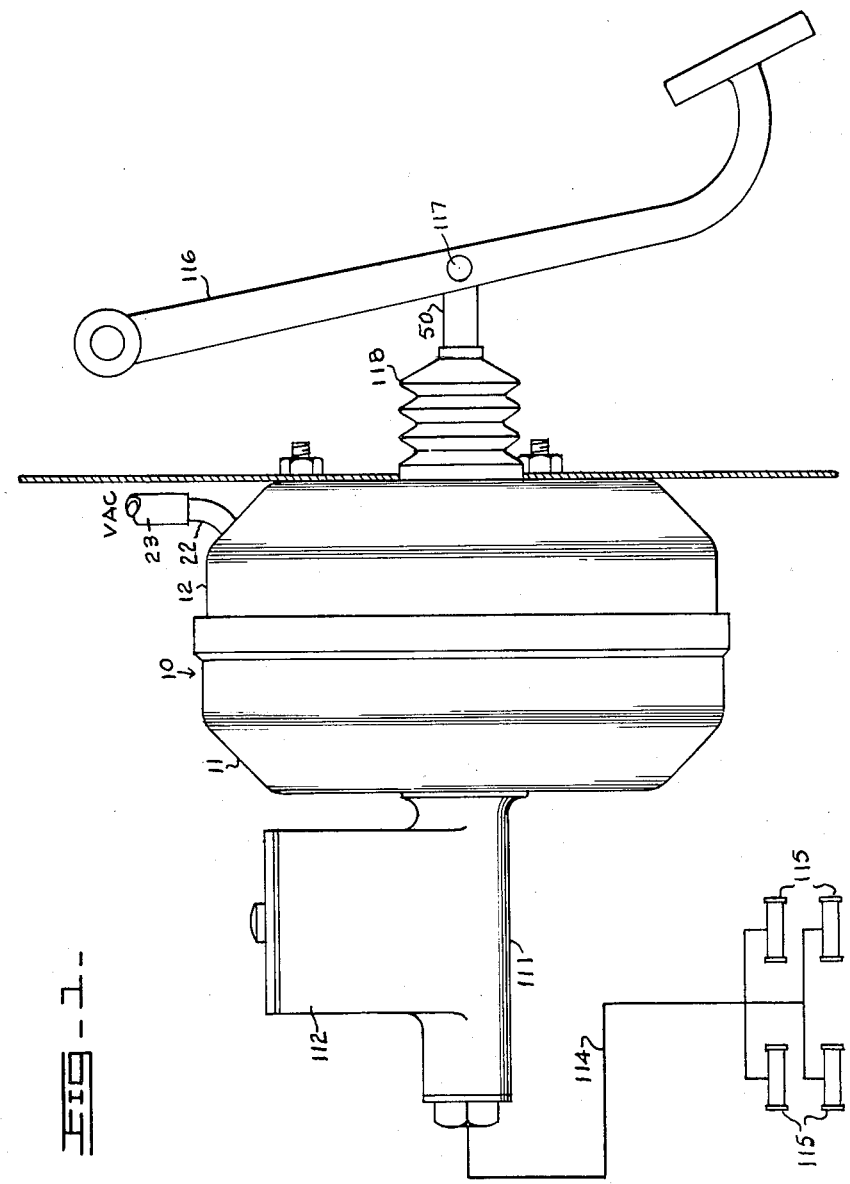
FIG-1-
INVENTOR
WILLIAM STELZER
BY John F. Phillips
ATTORNEY

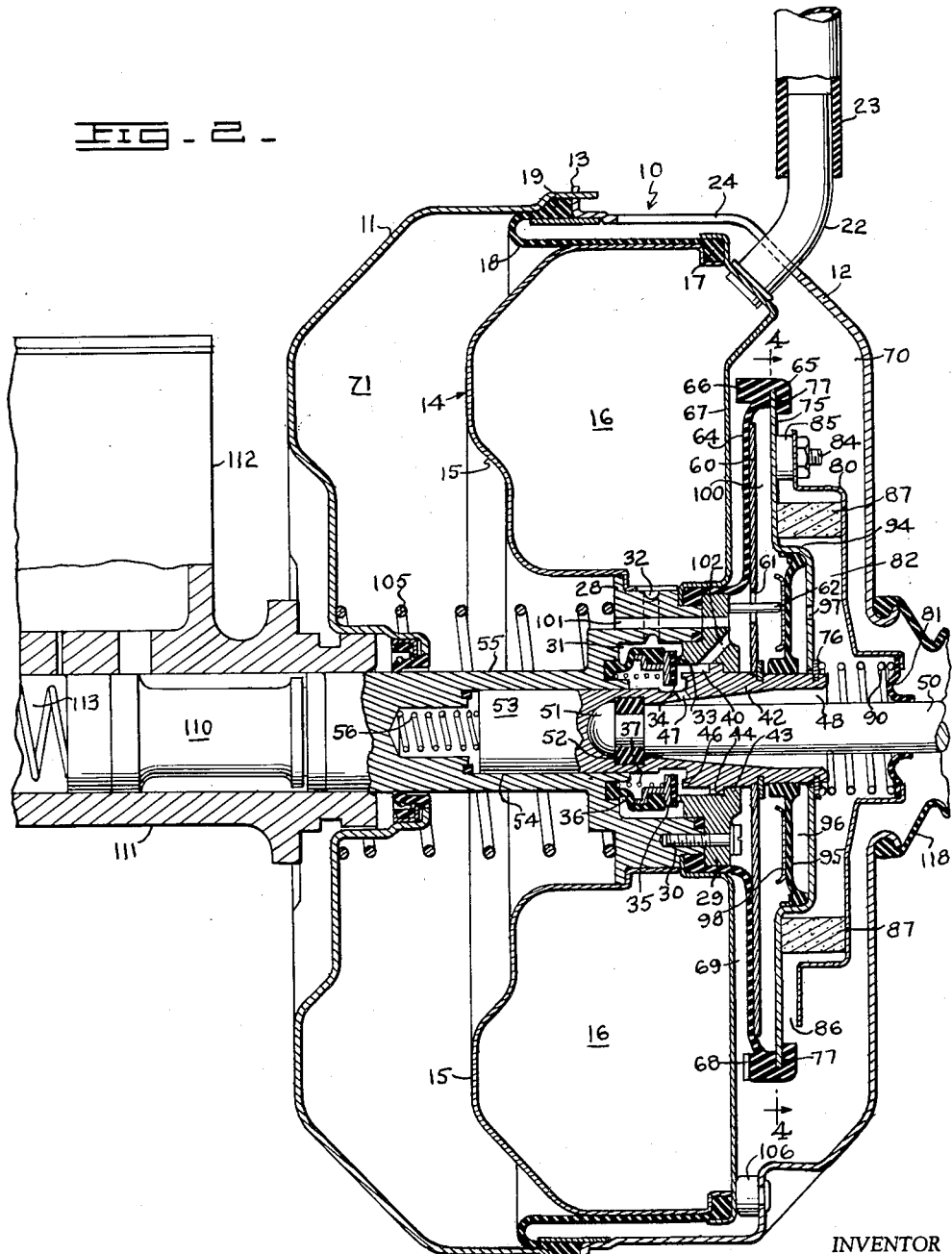

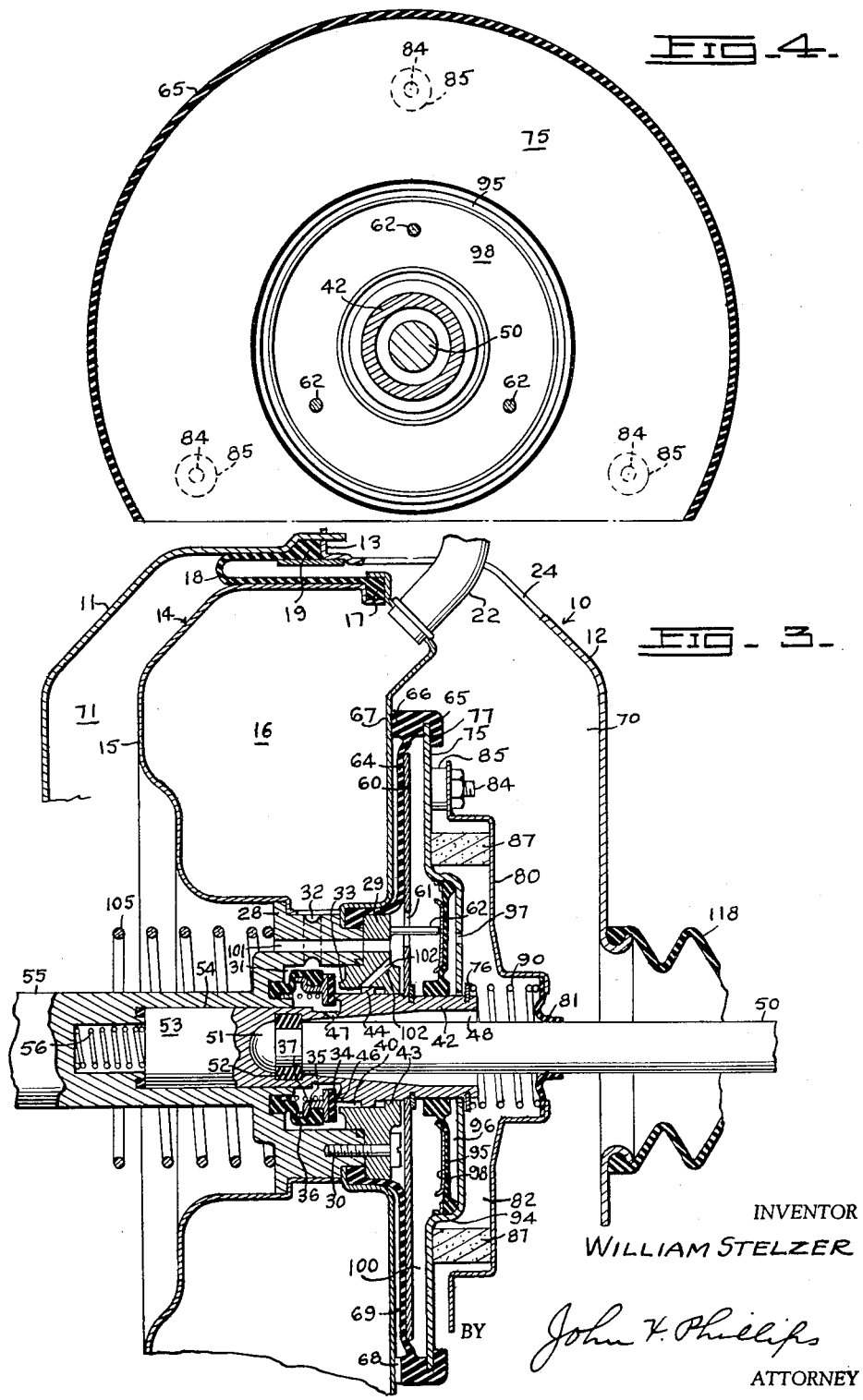

United States Patent Office 2,976,850
Patented Mar. 28, 1961

2,976,850

FLUID PRESSURE OPERATED MOTOR

William Stelzer, Bloomfield Hills, Mich., assignor to Kelsey-Hayes Company, Detroit, Mich., a corporation of Delaware Filed Aug. 7, 1959, Ser. No. 832,287

11 Claims. (Cl. 121—41)

This invention relates to fluid pressure operated motors and particularly relates to a motor of this type especially adapted for the operation of motor vehicle brakes.

It is a common practice in the manufacture of booster motors for vehicle braking systems to provide a relatively "soft" initial brake and to provide means which comes into operation usually when the brake shoes initially contact with the brake drums of the vehicle to react against the brake pedal to provide the latter with "feel." In such prior mechanisms, some type of reaction device, normally out of engagement with some manually operable part of the mechanism, moves into engagement with such part to transmit reaction to the brake pedal. Such engagement takes place relatively suddenly and, accordingly, disturbs the smooth transition from the initial operation of the brake pedal to the next stage of operation in which reaction is transmitted to the brake pedal.

An important object of the present invention is to provide novel means for transmitting reaction to the brake pedal and wherein sudden resistance to movement of the brake pedal at the point where the reaction means comes into operation is eliminated.

A further object is to provide novel fluid pressure responsive means for transmitting reaction to the brake pedal and to maintain engagement of such reaction means with a pedal operable part and to pressure-counterbalance such reaction only until it is desired to render the reaction means operative for resisting movement of the brake pedal.

A further object is to provide a motor structure of the character referred to, having two opposed pressure units, one of which is a reaction means connected to a pedal operable part and the other of which counterbalances reaction pressures affecting said reaction means until the brake shoes substantially initially contact the drums, whereupon said pressure counterbalancing unit ceases to oppose said reaction means and the latter, without moving relative to the pedal operable part since it is fixed thereto, transmits reaction forces to the brake pedal.

A further object is to provide a mechanism of the character referred to, in which an auxiliary pressure responsive device, operatively connected to the pressure responsive unit of the motor, subtracts from the area of the pressure counterbalancing unit so that the area of the latter unit may be designed to provide any reaction counterbalancing force desired, for example, slightly less than the exact counterbalancing force so that the reaction means may transmit some reaction to the brake pedal upon initial operation of the booster motor.

A further object is to provide a motor mechanism of this character in which the reaction counterbalancing unit has a portion normally spaced from the pressure responsive unit of the motor during initial motor energization and which moves into engagement with the pressure responsive unit of the motor when the latter is energized to a predetermined extent, thus removing its counterbalancing force from the reaction means to render the latter effective for reacting against the brake pedal.

Other objects and advantages of the invention will become apparent during the course of the following description.

In the drawings I have shown one embodiment of the invention. In this showing:

Figure 1 is a diagrammatic view of the braking system of a motor vehicle with the motor of the present invention shown in elevation;

Figure 2 is an enlarged axial sectional view through the motor and associated elements, with the parts illustrated in normal off positions;

Figure 3 is a fragmentary sectional view of a portion of the motor, with the parts shown in operative positions; and Figure 4 is a fragmentary sectional view on line 4—4 of Figure 2.

The motor as a whole embodying the present invention is indicated by the numeral 10 in Figures 1, 2 and 3 and comprises casing sections 11 and 12 suitably connected by any type of joint 13, forming no part of the present invention. The motor is provided with a pressure responsive unit indicated at 14 and comprising an annular shell 15 shaped in cross section as shown in Figure 2 and providing therein a vacuum reservoir 16 of substantial capacity. The shell 15 is connected to the inner bead of a rolling diaphragm 18 having its outer periphery beaded as at 19 to be clamped between the casing sections 11 and 12. The interior of the shell 15 communicates with an elbow 22 and has its outer end connected by a flexible hose 23 to a suitable source of vacuum such as the vehicle engine intake manifold. Obviously, the elbow 22 moves with the pressure responsive unit 14 and the casing 12 is provided with a slot 24 to accommodate such movement.

The pressure responsive unit further comprises preferably die-cast body members 28 and 29 connected to each other by screws 30. These body members provide an internal annular chamber 31 in fixed communication with the reservoir 16 through a passage 32. The body member 29 has an annular valve seat 33, normally engaged by a resilient annular valve 34 carried by a body 35 sealed with respect to the body member 28 by an annular diaphragm 36. A spring 37 biases the valve 34 toward the right to its normal position shown in Figure 2. Radially within the valve seat 33 is formed a chamber 40 for a purpose to be described.

A pedal operable member 42 is axially slidable in the body 29, the latter being provided with an annular flange 43 forming a bearing for the member 42. An annular flange 44 on the member 42 engages the bearing 43 to limit movement of the member 42 to its off position in Figure 2. The member 42 is provided with an annular valve seat 46 radially within and concentric with the valve seat 33. The space within the valve seat 46 communicates through a port 47 with a space 48 within the member 42, such space being open to the atmosphere, as described below.

A pedal operable rod 50 projects through the space 48 axially of the member 42 and is connected thereto by any suitable means, preferably including a spherical head 51 and a resilient ring 52 to provide some universal movement between the rod 50 and member 42. The means connecting the rod 50 to the member 42 is arranged within a pilot extension 53 integral with the member 42 and slidable in a bore 54 formed in an axial extension 55, preferably integral with the body member 28. The extension 53 and the elements connected thereto are biased to the right in Figure 2 by a spring 56.

The reaction means forming the principal subject matter of the present invention comprises a plate 60 (Figures 2 and 3) rigidly fixed to the member 42. The plate 60 is provided with circumferentially spaced openings 61 through which project pins 62 fixed to the body member 29 for a purpose to be described. Against the plate 60 is arranged an annular diaphragm 64 the inner periphery of which is secured with respect to the body members 28 and 29, as shown in Figure 2. The outer periphery of the diaphragm 64 is provided with a relatively heavy bead 65 one side of which is formed as an annular flange 66 normally spaced from the adjacent wall 67 of the shell 15. Under operating conditions to be described, the flange 66 moves into engagement with the wall 67, and the flange 66 is grooved as at 68 (see the lower portion of Figure 2) so that under all conditions, communication is maintained between a space 69 to the left of the diaphragm 64 and the constant pressure chamber 70 of the motor, in which atmospheric pressure is always present. At the side of the pressure responsive unit 14 opposite the chamber 70, the motor is provided with a control or variable pressure chamber 71 communicating in the off positions of the parts with the chamber 70. Upon operation of the valve mechanism of the motor, the chambers 70 and 71 are disconnected from each other, and the chamber 71 is connected to the vacuum reservoir 16, as described below.

A plate 75 is provided for counterbalancing pressures acting against the left-hand face of the diaphragm 64 (Figure 2) during the stage of initial motor operation. The inner periphery of the plate 75 normally seats against a snap ring 76 carried by the member 42. The outer periphery of the plate 75 seats in an annular groove 77 in the diaphragm bead 65. Adjacent the plate 75 in the chamber 70 is arranged a preferably stamped cover plate 80, the inner periphery of which is bonded to a sealing diaphragm 81 surrounding and snugly fitting the rod 50. The plates 75 and 80 form therebetween an air chamber 82. The plate 80 is secured with respect to the plate 75 by circumferentially spaced studs 84, the heads 85 of which are preferably welded to the plate 75. These stud heads serve to space the outer periphery of the plate 80 from the plate 75, thus providing between the stud heads air passages 86 communicating with the constant pressure motor chamber 70. This chamber, in turn, is in constant communication with the atmosphere through the slot 24. An annular air cleaner 87 is clamped between the plates 75 and 80 radially inwardly of the studs 84 to provide clean air to the space 48 leading to the valve mechanism.

A spring 90 surrounds the rod 50 and has one end seating against the snap ring 76. The other end of this spring seats against the radially outer portion of the diaphragm 81 to transmit a force to the plate 80 tending to move it, together with the plate 75, toward the right. The spring 90 thus tends to maintain the inner periphery of the plate 75 in engagement with the snap ring 76.

The plate 75 is shouldered as at 94, and between such shoulder and the member 42 is arranged an annular diaphragm 95. This diaphragm forms with the plate 75 a chamber 96 open to the chamber 82 through ports 97. Since the chamber 82 is always open to the atmosphere through the air cleaner 87, it will be apparent that atmospheric pressure is always maintained in the chamber 96. An annular pressure plate 98 is secured to the diaphragm 95, for example by bonding, and constantly engages the adjacent ends of the pins 62 for a purpose to be described.

The space between the plates 60 and 75 forms a chamber 100 which is in constant communication with the motor chamber 71 through a passage 101. The chamber 100 also is in fixed communication with the valve chamber 40 through a passage 102 formed in the body member 29. Since this valve chamber normally is in communication with the atmosphere through passage 47, space 48 and air chamber 82, and since the valve chamber 40 normally communicates with the motor chamber 71 through passages 102 and 101, it will be obvious that atmospheric pressure is normally present in the chamber 71 and accordingly the motor is air-suspended. The pressure responsive unit, when atmospherically balanced, is held in the off position in Figure 2 by a return spring 105. The motor casing 12 is preferably provided with rubber bumpers 106 against which the periphery of the shell 15 is normally seated when the motor is de-energized.

The axial extension 55 terminates at its left-hand end (Figure 2) in a master cylinder plunger 110 operable in a master cylinder 111 having the usual reservoir 112. Operation of the plunger 110 displaces fluid from a master cylinder chamber 113 through lines 114 (Figure 1) to the vehicle wheel cylinders 115. The valve mechanism of the motor is operated through depression of a brake pedal 116 pivoted as at 117 to the push rod 50. This rod is preferably connected to the motor casing 12 by a conventional flexible boot 118.

*Operation*

The motor as illustrated is of the air-suspended type, as stated, and accordingly atmospheric pressure is normally present in both motor chambers 70 and 71. The motor is operated by depressing the brake pedal 116 (Figure 1) to operate the rod 50 and thus move the member 42 to the left in Figure 2. Initial movement of the member 42 engages the valve seat 46 with the valve 34, to disconnect the valve chamber 40 from the atmospheric passage 47. The valve parts will now be in lap position. Continued movement of the member 42 will cause the valve seat 46 to move the valve 34 away from the seat 33, thus "cracking" the valve chamber 40 to the chamber 31. This chamber communicates with the vacuum reservoir 16 through the passage 32, and accordingly air will be exhausted from the motor chamber 71 through passages 101 and 102. The diaphragm 64, plate 75 and diaphragm 95 seal the passages 101 from the motor chamber 70, and upon exhaustion of air from the motor chamber 71, air pressure in the motor chamber 70 will move the pressure responsive unit 14 to the left, for example, to the position shown in Figure 3.

Operation of the motor as described moves the plunger 110 to the left in Figure 2 to displace fluid from the chamber 113 into the brake lines 114 and thus to the wheel cylinders 115 to apply the brakes. The valve mechanism provides the usual follow-up action of the pressure responsive unit 14 and plunger 110 with respect to movement of the pedal operable rod 50. If pressure is to be applied to the plunger 110 after the motor is energized to its maximum extent, forces applied to the pilot extension 53 will transmit forces directly to the axial extension 55, as will be obvious.

The brakes are released by releasing the brake pedal 116, whereupon the spring 56 will move the valve seat 46 to the right until the flange 44 engages the bearing flange 43. The spring 37 will cause the valve 34 to follow such movement until the valve engages the seat 33, the valve seat 46 continuing to move beyond such point to re-establish connection between the valve chamber 40 and the atmosphere through passage 47. Thus the motor chamber 71 will be connected to the atmosphere and the spring 105 will move the pressure responsive unit 14 to its off position, with the wall 67 engaging the bumpers 106.

The use of the vacuum reservoir 16 provides for an extremely rapid evacuation of the chamber 71, thus rendering response of the pressure responsive unit more rapid than is possible with conventional air-suspended motors, while at the same time eliminating the faults present in vacuum-suspended motors, such as the difficulty of sealing the master cylinder from the adjacent motor chamber. The vacuum reservoir 16 and its combination with other elements of the mechanism form no part of the present invention but are disclosed and claimed in my copending application Serial No. 831,246, filed August 3, 1959.

The principal feature of the present invention lies in the functioning of the novel reaction means referred to above. It has been proposed in the past to provide reaction devices which normally are disengaged from, but are movable into engagement with, pedal operable elements of the mechanism, such engagement taking place after the motor has been energized to a predetermined extent. Such prior mechanism would be comparable, for example, to the arrangement of the plate 60 in spaced relation to the snap ring around the member 42 normally engaged by the plate 60. Such spacing of the plate 60 from its snap ring would be accomplished by a counter-reaction spring which would be overcome at a predetermined point in the operation of the motor. The reaction means, such as the plate 60, would then move into engagement with a stop element such as the snap ring referred to, and the force of such engagement would be felt through the brake pedal, thus destroying a smooth transition from initial pedal operation to the reaction stage. The present reaction means completely overcomes such fault. The plate 60 is fixed with respect to the rod 50 and merely becomes operative, without any "jolting" action, at the predetermined time when the transmission of reaction to the brake pedal is desired.

In the present construction, the effective area of the right-hand facing surfaces of the plate 75 is reduced by the presence of the diaphragm 95. When the valve mechanism is operated to energize the motor, pressure in the chamber 100 is reduced, and accordingly there will be two opposing pressure forces acting against the remote surfaces of the diaphragm 64 and plate 75, the pressure acting against the diaphragm 64 being transmitted to the plate 60. If the opposing pressure responsive faces of the diaphragm 64 and plate 75 are equal, there will be no net reaction force acting to the right in Figure 2 against the pedal operable rod 50, and thus a "soft" initial pedal is provided. Forces exerted against the diaphragm 95 are transmitted directly to the body member 29 through the pins 62.

The plates 60 and 75 are prevented from initially moving toward each other by the spring 90, the force of which is transmitted through the plate 80, studs 84 and plate 75 to tend to prevent movement of the latter plate toward the plate 60 and to transmit to the member 42 pressures affecting the plate 75. Thus when the motor is initially energized, the opposing pressure surfaces referred to balance each other, and this balancing is maintained until the loading of the spring 90 is overcome. The spring 90 preferably has a predetermined loading such that it will be overcome when differential pressures in the motor chambers 70 and 71 increase incident to resistance to movement of the pressure responsive unit when the brake shoes are brought into engagement with the drums. At this point, the spring 90 will be overcome and the plates 75 and 80 will move to the left relative to the pressure responsive unit 14 until the flange 66 engages the wall 67. This limits movement of the plate 75 to the left, and atmospheric pressure in the chamber 70, acting toward the left against the plate 75, transmits force through the flange 66 to the pressure responsive unit. From this point on, increased pressures against the plate 75 will not be transmitted through the spring 90 to the member 42 and there can be no counterbalancing by the plate 75 of the atmospheric pressure acting to the right against the diaphragm 64. Such unopposed pressure is then transmitted from the plate 60 to the member 42 and thus to the brake pedal to provide the latter with the highly desirable reaction in later stages of brake operation. Since atmospheric pressure is always present in the chamber 69 and vacuum will be present in the chamber 100 in accordance with the degree of vacuum in the motor chamber 71, it will be obvious that reaction forces transmitted to the brake pedal will always be proportional to the degree of motor energization.

In some cases, it is desirable to provide some degree of reaction against the brake pedal at the beginning of motor energization. To secure this result, the shoulder 94 will be made of somewhat larger diameter with a corresponding enlargement of the outside diameter of the diaphragm 95. In such case, the effective area of the plate 75 open to atmospheric pressure in the chamber 70 will be slightly reduced below the effective area of the diaphragm 64 subject to pressure in the chamber 79. In such case, initial energization of the motor will result in a net difference in the effective pressure areas of the diaphragm 64 and plate 75, which net pressure will react in the same manner as described above, to provide some degree of reaction against the brake pedal. Such reaction will be much less than that which occurs after the loading of the spring 90 is overcome, but it is nonetheless proportional to the degree of initial motor energization.

It will be noted that the right-hand area of the plate 75 outwardly of the diaphragm 95 is greater than the area of the diaphragm 64 exposed to the chamber 69. At first glance, it would appear that greater total pressure would affect the left-hand side of the diaphragm than would affect the right-hand face of the plate 75. It will be noted, however, that some of the pressure acting to the right against the left-hand face of the diaphragm 64 is absorbed by the inner peripheral portion of such diaphragm, and the proportions of the parts shown in Figures 2 and 3 are such that in initial stages of motor operation, the effective counterbalancing pressures acting against the diaphragm 64 and plate 75 are equal.

From the foregoing, it will be apparent that the present invention provides a distinct advantage over prior reaction devices in that the reaction member 60 of the present construction has fixed connection with a pedal operable member, in the present case the member 42. Thus there will be no sudden response of a reaction member to motor or other pressures to move the reaction member suddenly into engagement with any pedal operable part. As previously stated, such prior constructions provide a light impact which the operator can feel through the brake pedal when the reaction means comes into operation. Accordingly, the transition from initial motor operation to the reaction stage of operation in the present construction is extremely smooth, and a much better pedal "feel" is provided.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a casing and a pressure responsive unit therein forming with said casing a control chamber, a valve mechanism having connection with said control chamber and with sources of different pressures and normally connecting such chamber to one of such pressure sources, said valve mechanism comprising a manually operable member movable to operate said valve mechanism to disconnect said control chamber from said one source and connect it to the other source, a first pressure responsive means comprising a reaction member fixed to said manually operable member and subject to pressures affecting said pressure responsive unit to tend to oppose movement of said manually operable member, a second pressure responsive means movable relative to said pressure responsive unit and movably connected to said first pressure responsive means and subject to differential pressures affecting said pressure responsive unit to oppose pressures affecting said first pressure responsive means to tend to prevent the latter from opposing movement of said manually operable member, and means rendering said second pressure responsive means ineffective for opposing said first pressure responsive means when differential pressures affecting said pressure responsive unit increase to a predetermined point.

2. A fluid pressure motor mechanism comprising a casing and a pressure responsive unit therein forming with said casing a control chamber, a valve mechanism having connection with said control chamber and with sources of different pressures and normally connecting such chamber to one of such pressure sources, said valve mechanism comprising a manually operable member movable to operate said valve mechanism to disconnect said control chamber from said one source and connect it to the other source, a first pressure responsive means comprising a reaction member fixed to said manually operable member and subject to pressures affecting said pressure responsive unit to tend to oppose movement of said manually operable member, a second pressure responsive means movable relative to said pressure responsive unit and movably connected to said first pressure responsive means and subject to differential pressures affecting said pressure responsive unit to oppose pressures affecting said first pressure responsive means to tend to prevent the latter from opposing movement of said manually operable member, resilient means engaging said second pressure responsive means to oppose movement thereof, and means operative upon movement thereof for absorbing the pressure force of said second pressure responsive means to prevent such force from being effective in opposition to said first pressure responsive means when said differential pressure increases to a predetermined point, to render said first pressure responsive means effective for opposing movement of said manually operable member.

3. A mechanism according to claim 2 wherein said means for absorbing the pressure force of said second pressure responsive means comprises an element normally spaced from said pressure responsive unit and movable into engagement therewith to transmit force from said second pressure responsive means to said pressure responsive unit when said differential pressure increases to said predetermined point.

4. A fluid pressure motor mechanism comprising a casing and a pressure responsive unit therein one side of which forms with said casing a control chamber, the other side of said pressure responsive unit being open to the atmosphere, a valve mechanism having connection with said control chamber and with sources of different pressures and normally connecting said control chamber to one of said sources, said valve mechanism comprising a manually operable member and being operable for disconnecting said control chamber from said one source and connecting it to the other source, a pair of connected pressure responsive means movable relative to each other and to said pressure responsive unit and arranged adjacent said other side of said pressure responsive unit and opposingly subject to differential pressures affecting said pressure responsive unit whereby said two pressure responsive means tend to counterbalance each other, one pressure responsive means comprising a reaction member fixed to said manually operable member, and means for rendering the other pressure responsive means ineffective for counterbalancing said one pressure responsive means when differential pressures affecting said pressure responsive unit increase to a predetermined point, whereby said reaction member becomes effective for opposing movement of said manually operable member.

5. A mechanism according to claim 4 wherein said last-named means comprises a spring tending to hold said other pressure responsive means in predetermined position relative to said one pressure responsive means, said spring being of a loading adapted to be overcome when pressures affecting said pressure responsive unit increase to a predetermined point, whereupon said other pressure responsive means moves relative to said one pressure responsive means, and stop means for absorbing the pressure force on said other pressure responsive means when it moves to a predetermined extent relative to said one pressure responsive means to prevent such force from being transmitted to said one pressure responsive means whereupon said reaction member becomes effective for opposing movement of said manually operable member.

6. A mechanism according to claim 4 wherein said last-named means comprises a spring tending to hold said other pressure responsive means in predetermined position relative to said one pressure responsive means, said spring being of a loading adapted to be overcome when pressures affecting said pressure responsive unit increase to a predetermined point, whereupon said other pressure responsive means moves relative to said one pressure responsive means, and means conected to said other pressure responsive means and normally spaced from said pressure responsive unit and movable into engagement therewith when said spring is overcome, to transmit pressure force from said other pressure responsive means to said pressure responsive unit whereupon said reaction member becomes effective for opposing movement of said manually operable member.

7. A fluid pressure motor mechanism comprising a casing and a pressure responsive unit therein one side of which forms with said casing a control chamber, a valve mechanism having conection with said control chamber and with sources of different pressures and normally conecting said control chamber to one of said sources, said valve mechanism comprising a manually operable member and being operable for disconnecting said control chamber from said one source and connecting it to the other source, a pair of connected pressure responsive means movable relative to each other and to said pressure responsive unit and having a pressure chamber therebetween communicating with said control chamber, the pressure responsive means of said pair having remote oppositely facing surfaces open to the atmosphere and of such areas that they tend to counterbalance each other, one of said pressure responsive means having a reaction member fixed to said manually operable member, spring means opposing movement of the pressure responsive means of said pair relative to each other, said spring means being of such loading that when a pressure change to a predetermined point occurs in said pressure chamber, the pressure responsive means of said pair move relative to each other, and stop means connected to the other pressure responsive means and operative upon said movement thereof to a predetermined extent for absorbing pressure forces affecting it whereupon said reaction member becomes effective for opposing movement of said manually operable member.

8. A mechanism according to claim 7 wherein said stop means comprises an element connected to said other pressure responsive means, said element being normally spaced from said pressure responsive unit and movable into engagement with the latter upon said movement of said other pressure responsive means whereby the pressure forces thereof are transmitted directly to said pressure responsive unit.

9. A fluid pressure motor mechanism comprising a casing and a pressure responsive unit therein one side of which forms with said casing a control chamber, the other side of said pressure responsive unit being open to the atmosphere, a valve mechanism having connection with said control chamber and with the atmosphere and with a source of vacuum and normally connecting said control chamber to the atmosphere, said valve mechanism comprising a manually operable member and being operable for disconnecting said control chamber from the atmosphere and connecting it to said source, a pair of connected relatively movable pressure responsive means adjacent said other side of said pressure responsive unit, one pressure responsive means comprising a reaction plate fixed at its inner periphery to said manually operable member and a diaphragm fixed at its inner periphery to said pressure responsive unit, the other pressure responsive means comprising a plate connected at its outer periphery to said diaphragm and forming therewith a pressure chamber communicating with said control chamber, said diaphragm and said plate having oppositely facing surfaces open to the atmosphere whereby said plate tends to move toward said reaction member when vacuum is present in said pressure chamber, spring means opposing such movement of said plate with a force adapted to be overcome when pressure in said pressure chamber drops to a predetermined point to move said plate toward said diaphragm, and stop means operative upon such movement of said plate for absorbing pressure forces affecting said plate whereupon said reaction member becomes effective for opposing movement of said manually operable member.

10. A mechanism according to claim 9 wherein said movement of said plate is toward said pressure responsive unit, said stop means comprising an element normally spaced from said pressure responsive unit and engageable therewith upon said movement of said plate to transmit pressure forces against the latter to said pressure responsive unit to render said reaction member effective for opposing movement of said manually operable member.

11. A mechanism according to claim 9 provided with a second diaphragm connected at its outer periphery to said plate and at its inner periphery to said manually operable member, one side of said second diaphragm being open to said pressure chamber and said plate being provided with an opening exposing the other side of said diaphragm to the atmosphere to reduce the effective pressure area of said plate open to the atmosphere so that it substantially counterbalances pressure affecting the first-named diaphragm, and means for transmitting forces from said second diaphragm to said pressure responsive unit.

References Cited in the file of this patent
UNITED STATES PATENTS

| | | |
|---|---|---|
| 2,745,383 | Hupp | May 15, 1956 |
| 2,818,835 | Hupp | Jan. 7, 1958 |
| 2,842,101 | Price | July 8, 1958 |
| 2,871,828 | Price | Feb. 3, 1959 |
| 2,880,704 | Price | Apr. 7, 1959 |